March 30, 1937. V. W. KLIESRATH 2,075,041
VEHICLE
Filed Jan. 19, 1934 3 Sheets-Sheet 1
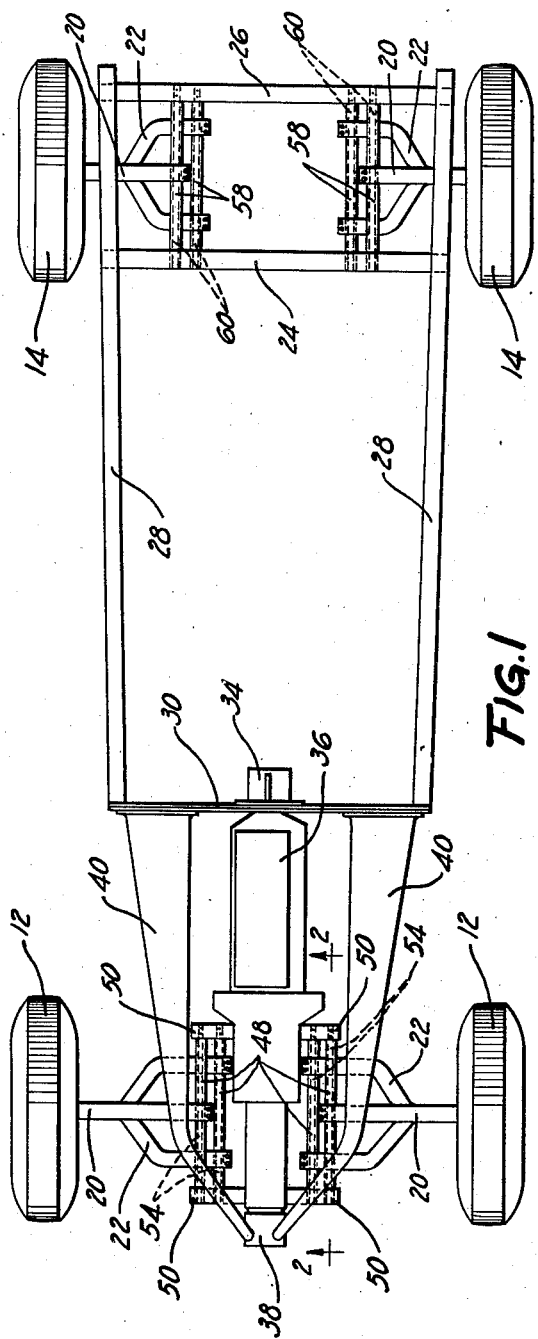
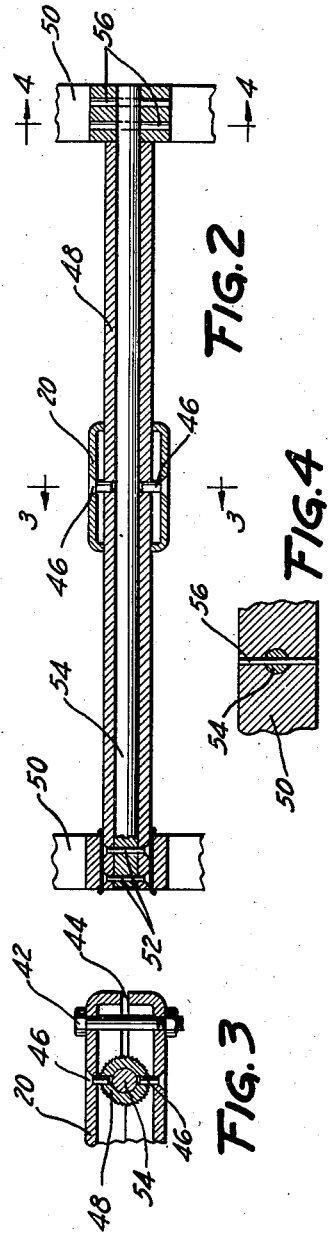
INVENTOR.
VICTOR W. KLIESRATH
BY
ATTORNEY.

March 30, 1937.  V. W. KLIESRATH  2,075,041
VEHICLE
Filed Jan. 19, 1934   3 Sheets-Sheet 2
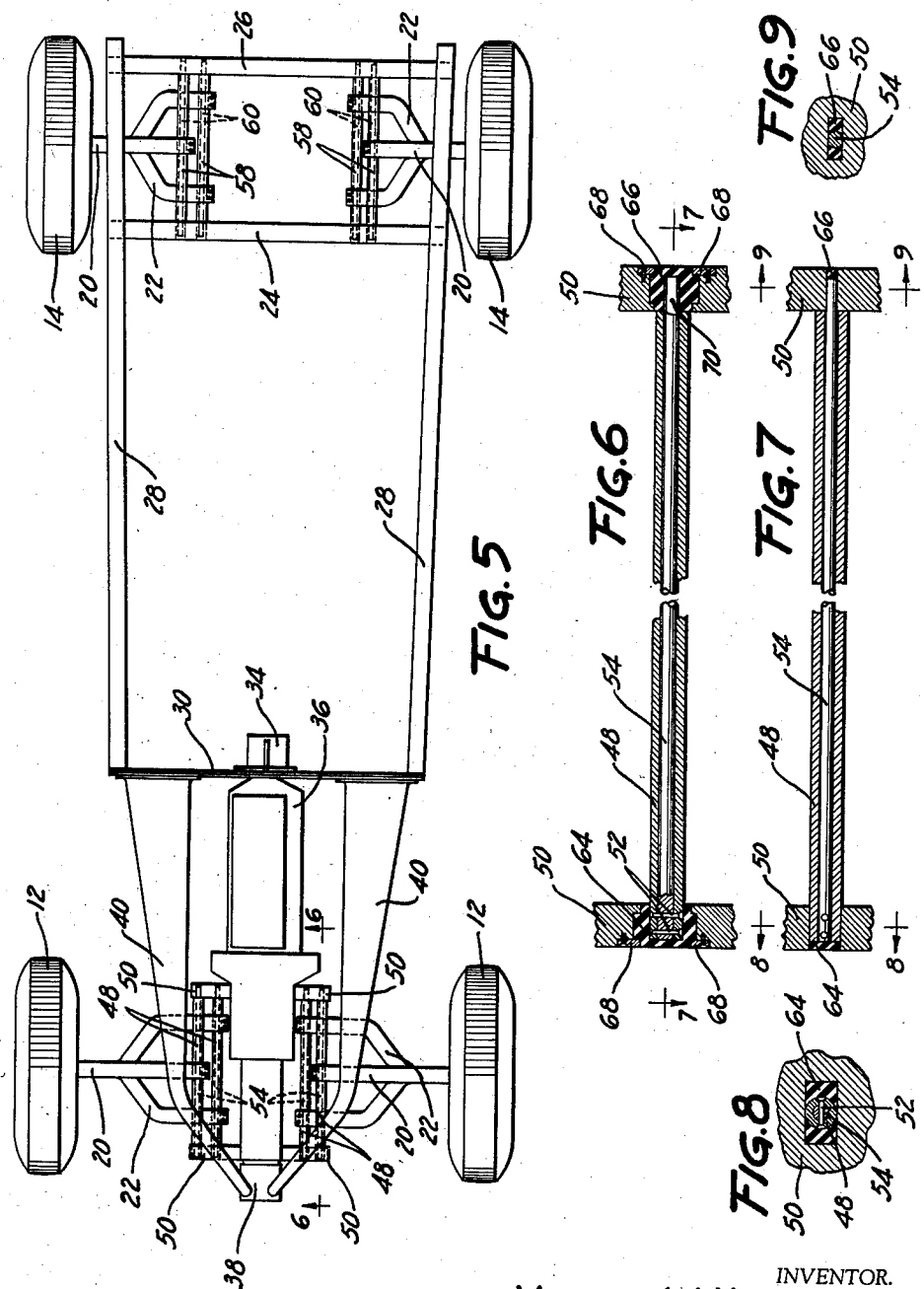
INVENTOR.
VICTOR W. KLIESRATH
BY
ATTORNEY.

March 30, 1937. V. W. KLIESRATH 2,075,041
VEHICLE
Filed Jan. 19, 1934 3 Sheets-Sheet 3
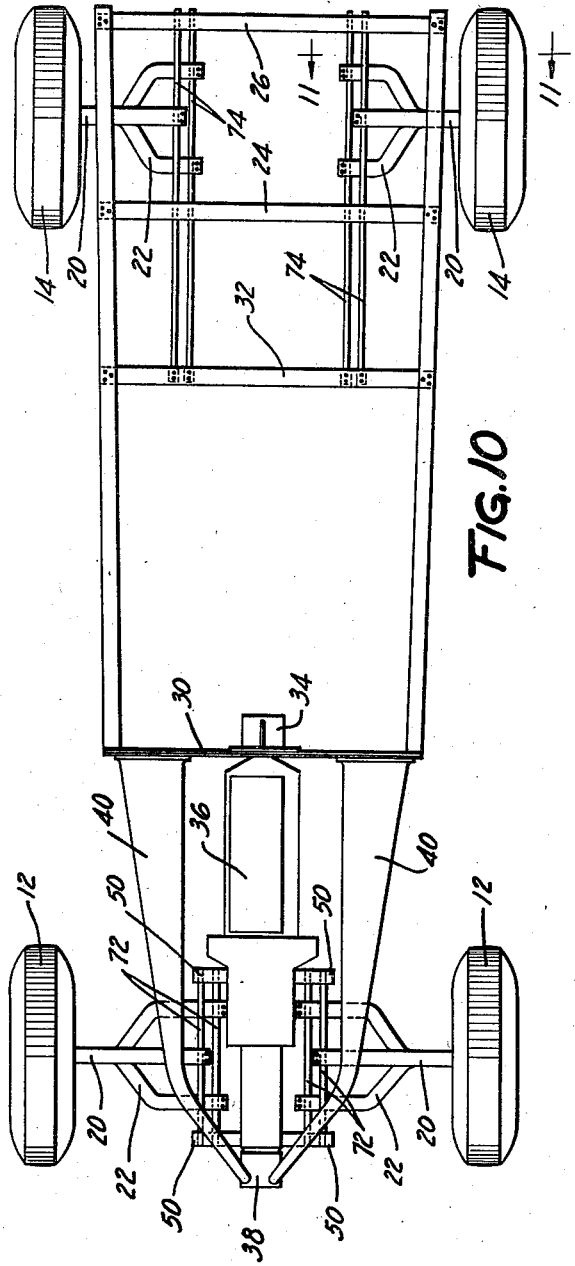
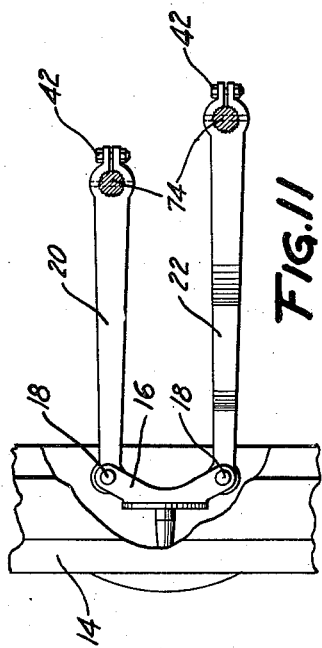
INVENTOR.
VICTOR W. KLIESRATH
BY
ATTORNEY.

Patented Mar. 30, 1937

2,075,041

UNITED STATES PATENT OFFICE 2,075,041

VEHICLE

Victor W. Kliesrath, South Bend, Ind., assignor to The Steel Wheel Corporation, Chicago, Ill., a corporation of New York Application January 19, 1934, Serial No. 707,267

14 Claims. (Cl. 267—57)

This invention relates to vehicles such as automobiles, and is illustrated as embodied in an automobile chassis having individually-sprung wheels.

An object of the invention is to simplify the spring suspension of a vehicle of this sort, by mounting the wheels directly on arms carried by torsion rods which form the spring elements of the suspension as well as the mounting for the arms, and which are mounted in a novel manner to extend longitudinally of the vehicle. Each of these torsion rods is free to rotate at one end as it is twisted by the wheel movements, but is held fixed against turning movements at its other end.

Preferably there are two arms (with their torsion rods) for each wheel, shown arranged one above the other and substantially parallel to each other, with a wheel-carrying member at their outer ends. The rear torsion rods are shown mounted, each being fixed at one end and free to rotate at the other, on parallel cross members which form reinforcements and stiffening means for the frame which carries the body. The front torsion rods are preferably similarly mounted in lugs formed on the sides of a power plant which is pivoted or otherwise movably mounted on the frame.

An important feature of the invention relates to an arrangement increasing the effective lengths of the torsion rods by mounting the wheel-carrying elements directly on sleeves which are mounted on the rods and which are secured by pins or other means to the rotatably mounted ends of the rods. Thus each rod becomes a torsion rod for its full length, and the effect may even be enhanced somewhat by designing the sleeve also to act as a torsion member between the wheel-carrying element and the rotatable end of the torsion rod.

If desired, the torsion rods may be cushioned against side thrust and other horizontal shocks by being mounted in resilient devices shown as rubber blocks. The rods are unyieldingly held against turning at their non-rotating ends, and preferably also are mounted between unyielding parts which prevent any bodily movement in a vertical direction.

The above and other objects and features of the invention, including various novel combinations of parts and desirable particular constructions, will be apparent from the following description of the illustrative embodiments shown in the accompanying drawings, in which:

Figure 1 is a top plan view of a chassis embodying the invention;

Figure 2 is a section through the mountings of one of the torsion rods, on the line 2—2 of Figure 1;

Figure 3 is a partial section through one of the rods and the corresponding wheel-carrying element, on the line 3—3 of Figure 2;

Figure 4 is a partial section, on the line 4—4 of Figure 2, showing the fixed end of the torsion rod;

Figure 5 is a top plan view of a chassis embodying another embodiment of the invention, in which the ends of the rod are cushioned by blocks of rubber or the like against horizontal shocks;

Figure 6 is a section, on the line 6—6 of Figure 5, showing one of the rods and its mountings;

Figure 7 is a section on the line 7—7 of Figure 6, showing the means unyieldingly holding the ends of the rod against vertical movements;

Figure 8 is a partial section, on the line 8—8 of Figure 7, through the mounting at one end of the rod;

Figure 9 is a partial section, on the line 9—9 of Figure 7, showing the mounting at the other end of the rod;

Figure 10 is a top plan view of a chassis embodying another form of the invention, in which the sleeves are omitted and the wheel-carrying elements are mounted directly on the torsion rods; and Figure 11 is a partial section, on the line 11—11 of Figure 10, showing the wheel-carrying elements of one wheel in rear elevation.

In all of the illustrated embodiments, the chassis includes front and rear road wheels 12 and 14, each rotatably mounted on a suitable knuckle 16 (Figure 11) connected by suitable parallel upper and lower pivots 18 to upper and lower generally parallel wheel-carrying elements. The upper elements are shown as straight arms 20, and the lower ones as arms 22 which are forked (Y-shaped) in plan view, to give stability against side thrusts and other shocks. As shown in Figure 3, each of the arms may conveniently be made by welding together face to face two channel-shaped steel stampings.

The rear arms 20 and 22 form parts of spring suspensions described below, and which are carried by rigid cross members 24 and 26 connecting and bracing side frame members 28 connected by a vertical dash structure 30 at their forward ends. In the embodiment of Figure 10 there is a third cross member 32.

The dash 30 carries a bearing 34 pivotally supporting the rear end of a power plant 36 which has, in one rigid unit, an engine and a clutch and a differential and a transmission. The front end of this unit is pivotally supported by a bearing 38 carried by means such as tapering hollow stamped steel arms 40 mounted on the dash 30 on opposite sides of the power plant. The power plant just described drives the front wheels 12 through suitable universally-jointed driving shafts (not shown).

The chasses as described above are generally enough to receive the ends of sleeves 48 (at the those described and claimed in my prior applications Nos. 651,821, filed January 14, 1933, and 677,610, filed June 26, 1933.

In the embodiment of Figures 1-4, the front arms 20 and 22 are mounted, as for example by clamp bolts 42 drawing up on slots 44 in the ends of the arms to contract serrated openings in the arms, and if desired also by keys or pins 46, upon torsion sleeves or tubes 48.

The sleeves 48 are rotatably mounted at their front ends in bearings provided in lugs 50 projecting from the casing of the power plant 36, and are connected (e. g. by pins 52) to the rotatable forward ends of torsion rods 54, in such a manner as to prevent relative rotational movement between the sleeves and rods at their forward ends.

The rear ends of the torsion rods 54 are non-rotatably held, by pins or keys 56 or the like, in seats in the rear lugs or brackets 50. The sleeves 48 at their rear ends may if desired extend substantially up to the faces of the rear lugs 50, although this is more a matter of appearance than necessity.

The rear arms 20 and 22 are similarly mounted on torsion sleeves 58, similarly rotatably supported at their forward ends in bearings formed in or carried by the cross member 24. The front ends of the sleeves 58 similarly are non-rotatably secured to the front ends of torsion rods 60 extending through the sleeves and pinned or keyed at their rear ends in seats in the cross member 26.

It will be seen that the spring suspensions for the four wheels utilize the torsional spring effect of the four torsion rods 54 and 60 for their entire lengths, as well as a partial cumulative effect for part of the length of each sleeve 48 or 58 (i. e. for the distance between its front end and the arm 20 or 22 mounted thereon).

As more fully explained in my above-mentioned prior application No. 651,821, it is desirable that arms 22 be somewhat longer than arms 20, so that each wheel is tilted slightly as it moves vertically, thereby keeping the point of intersection between the tire and the road in the same straight vertical line at all times, thus obviating dragging the tire crosswise over the road surface when the spring suspension is deflected by road shocks.

To this end, the torsion rods 54 or 60 for each wheel are not directly above each other in the same vertical plane, the lower one of each set being somewhat nearer the center line of the vehicle than the upper one.

The embodiment shown in Figures 5-9 is generally the same as described above, except that the opposite ends of the torsion rods are cushioned against horizontal shocks by means such as blocks 64 and 66 of rubber or the like, shown held by means such as clips 68 held by suitable screws or other fastenings.

In this case, the seats in the lugs 50 (and in cross members 24 and 26) are slots just wide enough to receive the ends of sleeves 48 (at the front ends) and rods 54 (at the rear ends), and thus form unyielding means preventing any bodily vertical movements of the torsion rods. The blocks 64 and 66 are seated in these slots. The rear ends of the torsion rods 54 are flattened at 70 and just fit slidably in their seats, and are thereby held against turning.

In the arrangement of Figure 10 and 11, the front arms 20 and 22 are clamped or pinned or otherwise secured directly upon horizontal longitudinally-extending torsion rods 72 which are rotatably supported at their front ends and fixedly secured at their rear ends in the lugs or brackets 50. The rear arms 20 and 22 are similarly directly secured to horizontal longitudinally-extending torsion rods 74 fixedly secured at their forward ends to the cross member 32, and rotatably supported by bearings formed in or carried by the two cross members 24 and 26. Members 24 and 26 are arranged respectively ahead of and behind the arms 20 and 22.

It will be noted that the front spring suspension shown in any one of the above-described embodiments may if desired be used with the rear spring suspension shown in any one of the others.

While several illustrative embodiments have been described in detail, it is not my intention to limit the scope of the invention to those particular embodiments, or otherwise than by the terms of the appended claims.

I claim:

1. A vehicle having a wheel, upper and lower rods running longitudinally of the vehicle and each having one part fixedly and another part rotatably mounted on the vehicle, the lower rod being considerably closer to the longitudinal center line of the vehicle than the upper rod, and a laterally-extending arm secured to and carried by each of said rods at one end and having said wheel mounted at their other ends, the lower arm being longer than the upper arm and, the ends of said arms adjacent the wheel being substantially vertically in line with each other, whereby said rods torsionally resist vertical movements of the wheel, said arms being secured to the rods intermediate the ends thereof.

2. A vehicle having a wheel, upper and lower rods running longitudinally of the vehicle and each having one part fixedly and another part rotatably mounted on the vehicle, and a laterally extending arm secured to and carried by each of said rods at one end and having said wheel mounted at their other ends, whereby said rods torsionally resist vertical movements of the wheel, the upper arm being straight and the lower arm being Y-shaped and formed at the end opposite the wheel with parts spaced a considerable distance apart longitudinally of the vehicle to steady the wheel against twisting strains and against shocks directed longitudinally of the vehicle, said arms being secured to the rods intermediate the ends thereof.

3. A vehicle spring suspension comprising a torsion rod fixed against rotational movement adjacent one end and free to turn at its other end, a sleeve mounted on said torsion rod and secured to turn with said other end of the torsion rod, but otherwise free to turn upon said rod, and a wheel-supporting element formed of two channel-section members secured face to face and notched at their meeting edges to embrace said sleeve and clamped thereto to turn therewith.

4. A vehicle spring suspension comprising a pair of generally-parallel torsion rods each fixed against rotational movement adjacent one end and free to turn at its other end, the lower rod being considerably nearer the center of the vehicle than the upper rod, a sleeve mounted on each of said torsion rods and secured to turn with said other end of the torsion rod, but otherwise free to turn upon said rod, and a pair of wheel-supporting elements secured respectively on said sleeves to turn therewith whereby said rods and the parts of said sleeves between said elements and the ends of the sleeves secured to the rods form in effect torsion springs of greater length than the rods and yieldingly resisting angular movement of said elements.

5. A vehicle spring suspension comprising a pair of generally-parallel torsion upper and lower rods each fixed against rotational movement adjacent one end and free to turn at its other end, the lower rod being considerably nearer the center of the vehicle than the upper rod, a sleeve mounted on each of said torsion rods and secured to turn with said other end of the torsion rod, but otherwise free to turn upon said rod, and a pair of wheel-supporting elements of unequal length secured respectively on said sleeves to turn therewith, the ends of said elements adjacent the wheel being substantially vertically in line, whereby said rods and the parts of said sleeves between said elements and the ends of the sleeves secured to the rods form in effect torsion springs of greater length than the rods and yieldingly resisting angular movement of said elements, said elements being arranged one above the other and in effect forming a parallel-link mechanism supporting the wheel.

6. A vehicle having a power plant pivotally supported thereon, torsion rods mounted on opposite sides of the power plant and paralleling the axis of movement of the power plant, arms carried by said rods and movable angularly to twist said rods against the resistance thereof, and wheels mounted on said arms.

7. A vehicle having a power plant pivotally supported thereon, torsion rods mounted on opposite sides of the power plant and paralleling the axis of movement of the power plant, sleeves mounted on said rods and secured at their ends to the ends of the rods, arms carried by said sleeves and movable angularly to twist said rods against the resistance thereof, and wheels mounted on said arms.

8. A vehicle having a frame including parallel cross members, torsion rods extending longitudinally of the vehicle and each fixedly secured at one end to one of the cross members and rotatably mounted at its other end on the other cross member, and laterally-projecting wheel-carrying arms secured to said rods intermediate their ends.

9. A vehicle having a frame including parallel cross members, torsion rods extending longitudinally of the vehicle and each fixedly secured at one end to one of the cross members and rotatably mounted at its other end on the other cross member, sleeves fixedly secured to the rotatably mounted ends of the rods and mounted on the rods to turn thereon except at said ends, and laterally-projecting wheel-carrying arms secured to and mounted on said sleeves.

10. A vehicle spring suspension comprising a torsion rod held against turning at one end and having a wheel-carrying element mounted thereon, and resilient means yieldingly resisting crosswise bodily movement of said rod.

11. A vehicle spring suspension comprising a torsion rod held against turning at one end and having a wheel-carrying element mounted thereon, resilient means yieldingly resisting horizontal bodily movement of said rod, and rigid means unyieldingly holding said rod against vertical bodily movement.

12. A vehicle spring suspension comprising a torsion rod held at one end against turning, a sleeve mounted on the rod and having means engaging the other end of the rod to prevent relative angular movement between said end of the rod and the corresponding end of the sleeve, wheel-carrying means mounted on the sleeve with the sleeve and rod yieldingly resisting angular movement thereof, and resilient means yieldingly resisting side thrusts against the rod through the wheel-carrying means.

13. A vehicle spring suspension comprising a torsion rod held at one end against turning, a sleeve mounted on the rod and having means engaging the other end of the rod to prevent relative angular movement between said end of the rod and the corresponding end of the sleeve, wheel-carrying means mounted on the sleeve with the sleeve and rod yieldingly resisting angular movement thereof, and rubber blocks yieldingly resisting side thrusts against the rod through the wheel-carrying means.

14. A vehicle spring suspension comprising a torsion rod held at one end against turning, a sleeve mounted on the rod and having means engaging the other end of the rod to prevent relative angular movement between said end of the rod and the corresponding end of the sleeve, wheel-carrying means mounted on the sleeve with the sleeve and rod yieldingly resisting angular movement thereof, and rubber blocks yieldingly resisting side thrusts against the rod through the wheel-carrying means, said blocks embracing the opposite ends of said rod.

VICTOR W. KLIESRATH.